US011699342B2

(12) United States Patent
Perumalla et al.

(10) Patent No.: US 11,699,342 B2
(45) Date of Patent: Jul. 11, 2023

(54) REDUCING VEHICLE OCCUPANT ACTIVITY

(71) Applicant: International Business Machines Corporation, Armonk, NY (US)

(72) Inventors: Saraswathi Sailaja Perumalla, Visakhapatnam (IN); Shanthan Chamala, Malvern, PA (US); Neela Vauhini Komaragiri, Visakhapatnam (IN); Narendra Reddy Tippala, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/509,827

(22) Filed: Oct. 25, 2021

(65) Prior Publication Data

US 2023/0126254 A1 Apr. 27, 2023

(51) Int. Cl.
*G08B 21/02* (2006.01)
*G08G 1/01* (2006.01)
*G08G 1/017* (2006.01)
*G06V 20/58* (2022.01)
*G06F 18/22* (2023.01)

(52) U.S. Cl.
CPC ........... *G08G 1/0145* (2013.01); *G06F 18/22* (2023.01); *G06V 20/582* (2022.01); *G08G 1/0112* (2013.01); *G08G 1/0175* (2013.01)

(58) Field of Classification Search
CPC ............... G08G 1/0145; G08G 1/0112; G08G 1/0175; G06K 9/6201; G06V 20/582
See application file for complete search history.

(56) References Cited

U.S. PATENT DOCUMENTS

| 6,067,007 | A | 5/2000 | Gioia |
| 9,583,000 | B2 | 2/2017 | Gao |
| 2006/0244576 | A1 | 11/2006 | Sugie |
| 2019/0096215 | A1* | 3/2019 | Shahid .................. G06V 10/56 |

(Continued)

FOREIGN PATENT DOCUMENTS

| CN | 103714697 B | 10/2015 |
| CN | 106157630 B | 8/2019 |
| EP | 3391281 A1 | 10/2018 |

OTHER PUBLICATIONS

"Automatic Number Plate Recognition (ANPR)", police.uk, 2 pages, printed on Jun. 2, 2021, <https://www.police.uk/pu/advice-crime-prevention/automatic-number-plate-recognition/>.

(Continued)

*Primary Examiner* — Hongmin Fan
(74) *Attorney, Agent, or Firm* — David B. Woycechowsky

(57) ABSTRACT

In an approach to safely facilitate driver responses to road traffic event alerts, computer-implemented methods, computer program products, and computer systems for reducing vehicle occupant distractions are described. The computer-implemented method includes processors configured for receiving vehicle alert data corresponding to a road traffic event, generating a user alert prompt corresponding to the vehicle alert data, transmitting the user alert prompt to a user vehicle satisfying a first condition, and receiving a user response from an occupant of the user vehicle. Responsive to receiving an affirmative user response, activating one or more vehicle activity systems to reduce vehicle cabin activity by occupants within the user vehicle.

14 Claims, 5 Drawing Sheets

(56) References Cited

U.S. PATENT DOCUMENTS

2019/0275888 A1   9/2019  Kirsch
2019/0340449 A1*  11/2019 Kench ................. G06V 20/582

OTHER PUBLICATIONS

"Crowd Behavior Analysis", NEC, Hong Kong, printed on Jun. 2, 2020, 3 pages, <https://hk.nec.com/en_HK/solutions/bysolutions/video_analytics/crowd_behavior_analysis.html>.
"LED Signs and Message Displays—Daktronics", printed on Jun. 2, 2021, 3 pages, <https://www.daktronics.com/en-us/products/message-displays>.
Darekar et al., "Traffic Sign Detection and Driver Alert System", ISSN: 2278-909X International Journal of Advanced Research in Electronics and Communication Engineering (IJARECE), vol. 5, Issue 5, May 2016, 3 pages.
Mack, Justin L., "What is an Amber Alert? What is a Silver Alert? Here's the difference", IndyStar, Mar. 20, 2019, 2 pages, <https://www.indystar.com/story/news/2019/03/20/what-is-amber-alert-what-is-silver-alert-here-difference-in-missing-people-notices/3222419002/>.
Manjooran et al., "Traffic Sign Board Detection and Voice Alert System Along with Speed Control", Asian Journal of Applied Science and Technology (AJAST), (Open Access Quarterly International Journal) vol. 2, Issue 1, 2018, 6 pages.
S, Harini et al., "A Smart Driver Alert System for Vehicle Traffic using Image Detection and Recognition Technique", 2017 2nd IEEE International Conference on Recent Trends in Electronics Information & Communication Technology (RTEICT), May 19-20, 2017, India, 4 pages.

* cited by examiner

REDUCING VEHICLE OCCUPANT ACTIVITY

BACKGROUND

The present invention relates generally to the field of motor vehicle operator safety, and more particularly to reducing vehicle occupant activity and distractions while responding to road traffic events.

One of the most common reasons for vehicle accidents is distracted driving. Motor vehicle operators navigating roadways are easily distracted from maintaining focus on the road due to momentarily attending to mobile phone alerts and other mobile phone use while driving. Other activities that distract motor vehicle operators include operating the radio (e.g., changing radio station, adjusting volume), eating, extended gazing out the window at distractions (e.g., road signs, buildings, trees, animals, other drivers). Additional distractions may be presented by signs and message posts encouraging drivers to keep a look out for a road traffic event (e.g., suspected vehicle, hazardous road activity, inclimate weather, local radio alert). Motor vehicle operator distractions increase the chance of an accident occurring, leading to costly damages to persons and property.

SUMMARY

Embodiments of the present invention disclose computer-implemented methods, computer program products, and computer systems for reducing vehicle occupant distractions. The computer-implemented method may include one or more processors configured for receiving vehicle alert data corresponding to a road traffic event, generating a user alert prompt corresponding to the vehicle alert data, transmitting the user alert prompt to a user vehicle satisfying a first condition, and receiving a user response from an occupant of the user vehicle. Responsive to receiving an affirmative user response from the occupant, the one or more processors may be configured for activating one or more vehicle activity systems.

DETAILED DESCRIPTION

Figure 1:
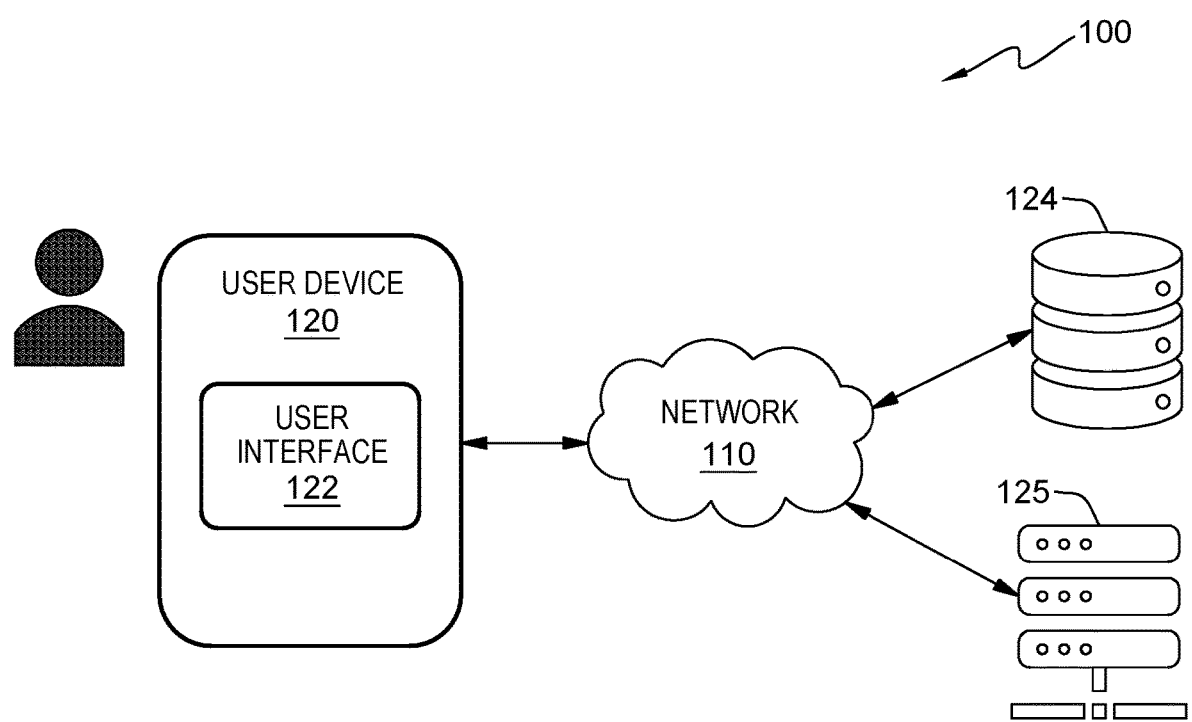
FIG. 1 is a functional block diagram illustrating a distributed data processing environment, in accordance with an embodiment of the present invention.

Embodiments of the present invention recognize that roadway dynamic message signs increase driver distraction because they require longer time periods for drivers to read and respond to. Further, roadway dynamic message signs are especially dangerous in traffic congested areas for the same reasons. While some roadway dynamic messages are informative and may provide critical public safety and health information, those public messages also solicit information from drivers and vehicle occupants. The solicited information is sought by local authorities to address a public safety event. To assist local authorities with responding to the public safety event, the driver is then tasked with keeping a keen eye out for information (e.g., a vehicle, weather conditions) fitting a certain description while maintaining safe driving practices. Although reporting information about the public safety event (e.g., a vehicle being driven by a criminal suspect) is a noble task, it increases driver distractions, which leads to increased chances of an accident.

In an embodiment, driver distractions caused by road traffic alerts may be reduced by leveraging computing device and/or vehicle activity systems to process and act on electronic dynamic messages displayed along roadways and on other vehicles. For example, the computing device may include one or more processors configured for receiving automatic reporting of road traffic events, identifying suspected information, and transmitting the identified information to a network accessible by local authorities. Other valuable contextual information may be provided, including the route of a suspected vehicle, or any other relevant information. The valuable contextual information may be shared with local authorities or any other desired parties without compromise on anonymity or privacy based on user preferences.

For example, in an embodiment, a road traffic event may include a reported stolen/missing vehicle electronic message comprising vehicle information including a license plate number (e.g., AP123), vehicle make (e.g., ABC motor company), vehicle model (e.g., 1 series), color (e.g., silver), incident information including location information (e.g., 123 Main Street, Anytown City), time information (e.g., 1300 hours), reporting contact information, route information (e.g., suspect vehicle traveling on State Highway 1) and any other pertinent information to be displayed on sign postings or announced via radio transmissions to the public within a geographical region. The user vehicle may be equipped with a Visual Recognition System (VRS), or be in communication with a VRS, that is configured to alert the driver (e.g., with a user alert prompt via a voice system) about the electronic message. The VRS may include one or more cameras configured to, be positioned to focus, or focused, on areas proximate to the vehicle. Further, the VRS may be configured to solicit a user response from the driver or occupant of the vehicle requesting permission to use the vehicle to identify the suspected vehicles by accurately parsing the passing/surroundings vehicle license plates. Furthermore, the VRS may be configured to gather other information about the passing/surrounding vehicles to report the gathered information to local authorities or other vehicles.

In an embodiment, once the driver acknowledges the message by providing a user response that is affirmative to the request, the VRS may send instructions to the one or more cameras attached to (or residing within) the vehicle to inspect the surrounding areas to gather image data used to determine if the suspected vehicle is within proximity of the user vehicle. If the suspected vehicle is identified, the VRS may be configured to notify the driver and provide information about the suspected vehicle. Further, the VRS may be configured to transmit the information about the suspected vehicle to local authorities. Information about the suspected vehicle may include the make, model, year, color, speed, direction of travel, location, and other relevant ascertainable information.

In an embodiment, the present invention provides a smart identification and notification system to report information gathered be the VRS to public safety contacts or local authorities. For example, vehicle routes traversed by or predicted to be traversed by the identified suspected vehicle may be leveraged to intelligently identify and notify the available public safety contacts along those vehicle routes to aid in immediately intercepting the suspected vehicle. Once the local authorities receive the reports of vehicle routes corresponding to the suspected vehicle, the local authorities may transmit that information to a public emergency alert system as customized messages including the suspected vehicle information and pertinent location information about the suspected vehicle. The messages may be customized to display the information electronically or to audibly broadcast the information over the local radio airwaves. Furthermore, if another vehicle detects and identifies the suspected vehicle at a first location, then the one or more processors may be configured to gather location information about the suspect vehicle at the first location and predict a route along which the suspected vehicle will be moving thereafter.

In an embodiment, the present invention provides a smart electronic dynamic message parsing system to process the static and dynamic electronic messages displayed along the roadways. The smart electronic dynamic message parsing system is also configured to intelligently alert drivers on deviations and other important notifications that are not easily identifiable and/or depend on driver input to function, thereby causing unsafe driver distractions. For example, the one or more processors may be configured to detect and process electronic messages displayed along the roadways. The electronic messages may include an alert for drivers to tune into a particular radio station frequency to receive a road traffic announcement. The electronic message may be transformed, by the one or more processors, to a voice utterance speaking the message to occupants in the user vehicle. Further, the voice message may be changed or modified from current audio options to desired audio options without any manual intervention from the occupant or driver of the user vehicle.

In an embodiment, the one or more processors may be configured to detect the electronic message stating, "Do Not Enter for X time period", which may be determined to be a critical alert for the driver if the vehicle is traveling in the direction and during the time identified in the electronic message. Thus, the one or more processors may be configured to generate and present an audible alert to the occupant or driver of the vehicle to assist in preventing the driver from entering the prohibited area of the road. The audible alert may be a voice message or a warning sign to give the driver an opportunity to take corrective actions. Further, the one or more processors may be configured to detect flash messages about reduced speed/work zones and automatically identify the flash messages to report back to the driver of the user vehicle if the vehicle is traveling beyond the posted speed limit.

In an embodiment, the one or more processors may be configured to detect if there is any abnormal situation occurring within proximity of the user vehicle. For example, abnormal situations include vehicle accidents, unexpected crowd gatherings, wherein any abnormal situations may be recorded, and notifications of such abnormal situations may be reported to nearby local authorities. Abnormalities may be detected based on historical traffic situation along a specific road or route.

In an embodiment, electronic messages may also include flash messages about upcoming or present reduced speed or work zones, wherein the VRS may be configured to automatically identify the flash messages and generate an alert to present to the occupants in the user vehicle if the user vehicle satisfies a condition. For example, if the VRS detects a flash message about a reduced speed zone (e.g., speed limit reduced to 35 miles per hour) as the road traffic event, then the one or more processors may be configured to generate a user alert to be presented to the user if a condition (e.g., user vehicle exceeding a published speed limit) is satisfied. Further, the one or more processors may be configured to determine the speed of the user vehicle and present the alert to the user vehicle occupant if the speed violates the reduced speed zone by a predetermined threshold. The alert may be presented visually, audibly, or haptically via a user interface of the computing device or via a user interface of the user vehicle.

In an embodiment, receiving the vehicle alert data further comprises receiving audio data based on audio signals detected within the user vehicle; identifying an emergency message in the audio data, and determining the vehicle information and incident information based on the emergency message.

In an embodiment, a condition may be satisfied if the user vehicle satisfies one or more criteria (e.g., within a geographical location). For example, user alert prompts may only be transmitted to a user vehicle if the criterion is that the user vehicle must be within a certain distance radius of the road traffic event. Other criteria may include temporal criteria wherein user alert prompts are only transmitted to a user vehicle after a certain amount of time, or for a certain time duration. Multiple criteria may be used in satisfying the condition.

Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes user device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between user device 120, server 125, and database 124. Distributed data processing environment 100 may also include additional servers, computers, or other devices not shown.

The term "distributed" as used herein describes a computer system that includes multiple, physically distinct devices that operate together as a single computer system. Many modifications to the depicted environment may be made by those skilled in the art without departing from the scope of the invention as recited by the claims.

User device 120 may operate to execute at least a part of a computer program for reducing vehicle occupant distractions. In an embodiment, user device 120 may be configured to send and/or receive data from one or more of database 124 and server 125 via network 110. User device 120 may include user interface 122 configured to facilitate interaction between a user and user device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with user device 120.

In some embodiments, user device 120 may be a management server, a web server, or any other electronic device or computing system capable of receiving and sending data. In some embodiments, user device 120 may be a laptop computer, tablet computer, netbook computer, personal computer (PC), a desktop computer, a smart phone, or any programmable electronic device capable of communicating with database 124, server 125 via network 110. User device 120 may include components as described in further detail in FIG. 5.

Database 124 operates as a repository for data flowing to and from network 110. Examples of data include data corresponding to communications entered and received via user interface 122. A database is an organized collection of data. Database 124 can be implemented with any type of storage device capable of storing data and configuration files that can be accessed and utilized by user device 120, such as a database server, a hard disk drive, or a flash memory. In an embodiment, database 124 is accessed by user device 120 to store data corresponding to messaging communications with via user interface 122. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with user device 120 and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 5.

Figure 2:
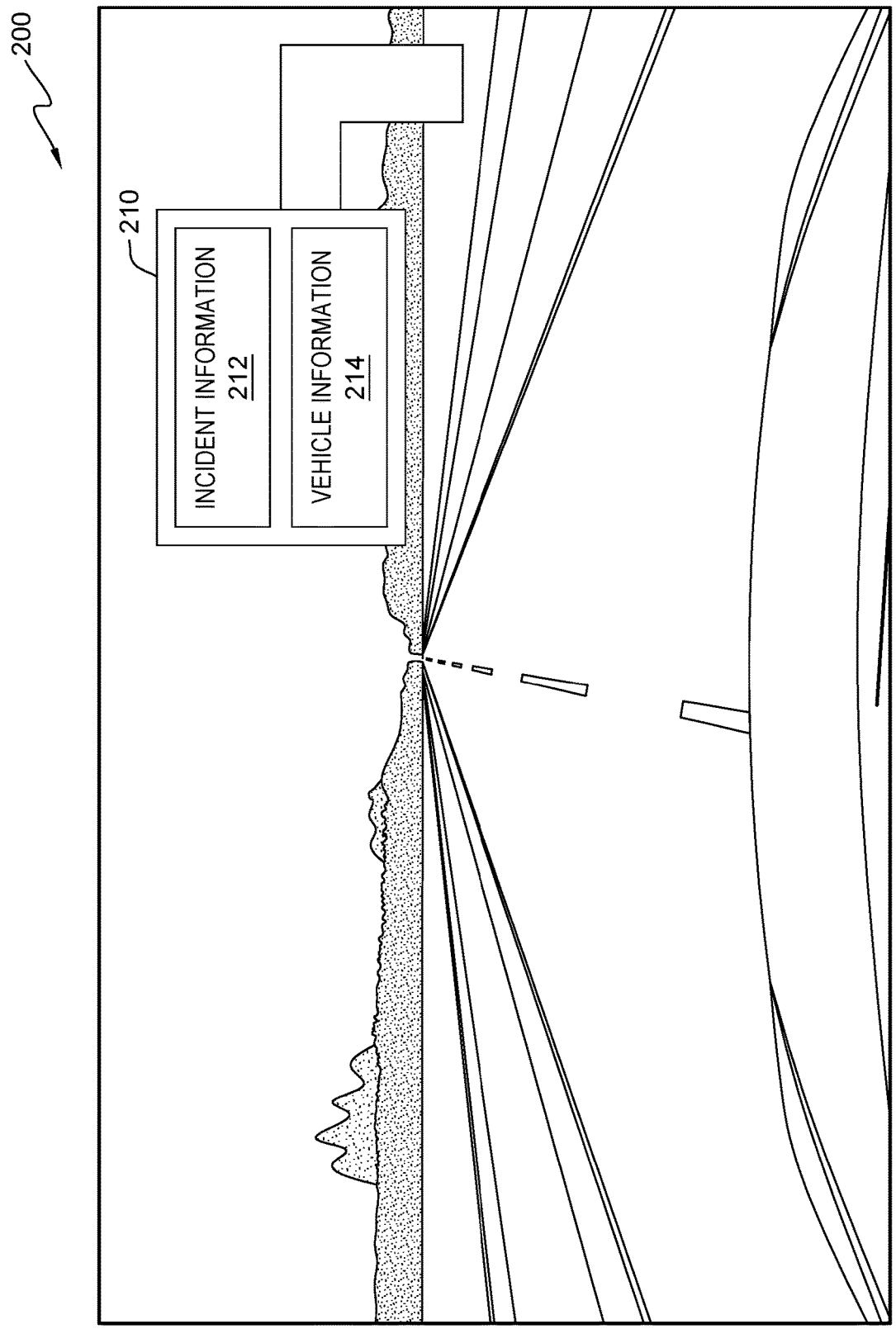
FIG. 2 depicts a driver view of a system for reducing vehicle occupant distractions, in accordance with an embodiment of the present invention.

FIG. 2 depicts a driver view of a system 200 for reducing vehicle occupant distractions, in accordance with an embodiment of the present invention.

In an embodiment, system 200 may include one or more processors configured for detecting message 210 displayed within proximity of a user vehicle, wherein the messages displayed may be determined to correspond to a road traffic event. For example, the one or more processors may include an image capture system (e.g., camera) configured to identify and capture images displayed on a message board including message 210. Once the image capture system obtains the image data from the message board, the one or more processors may be configured to process the image data to determine the content of the message and determine that the message corresponds to a road traffic event. The image data may include incident information 212 and vehicle information 214.

In an embodiment, incident information 212 may include a stolen vehicle alert, a missing person alert (e.g., America's Missing: Broadcast Emergency Response (AMBER) alert), road safety alert (e.g., accident reported ahead, traffic slow down reported ahead, roadkill reported ahead), weather alert (e.g., snow reported ahead, hail reported ahead, rain reported ahead), or any other information pertinent to a road traffic event alert.

In an embodiment, vehicle information 214 may include any information describing a vehicle referenced in incident information 212. For example, if incident information 212 includes a stolen vehicle alert, then vehicle information 214 may include one or more of the year, make, model, color, or location information (e.g., last known location, predicted future location) about the vehicle to assist the public in identifying the suspect vehicle.

In an embodiment, system 200 may be configured to process message 210 and the corresponding incident information 212 and vehicle information 214 determine the intent of message 210 and generate a user alert to be presented to occupants of user vehicle if a condition is satisfied, as described above herein.

Figure 3:
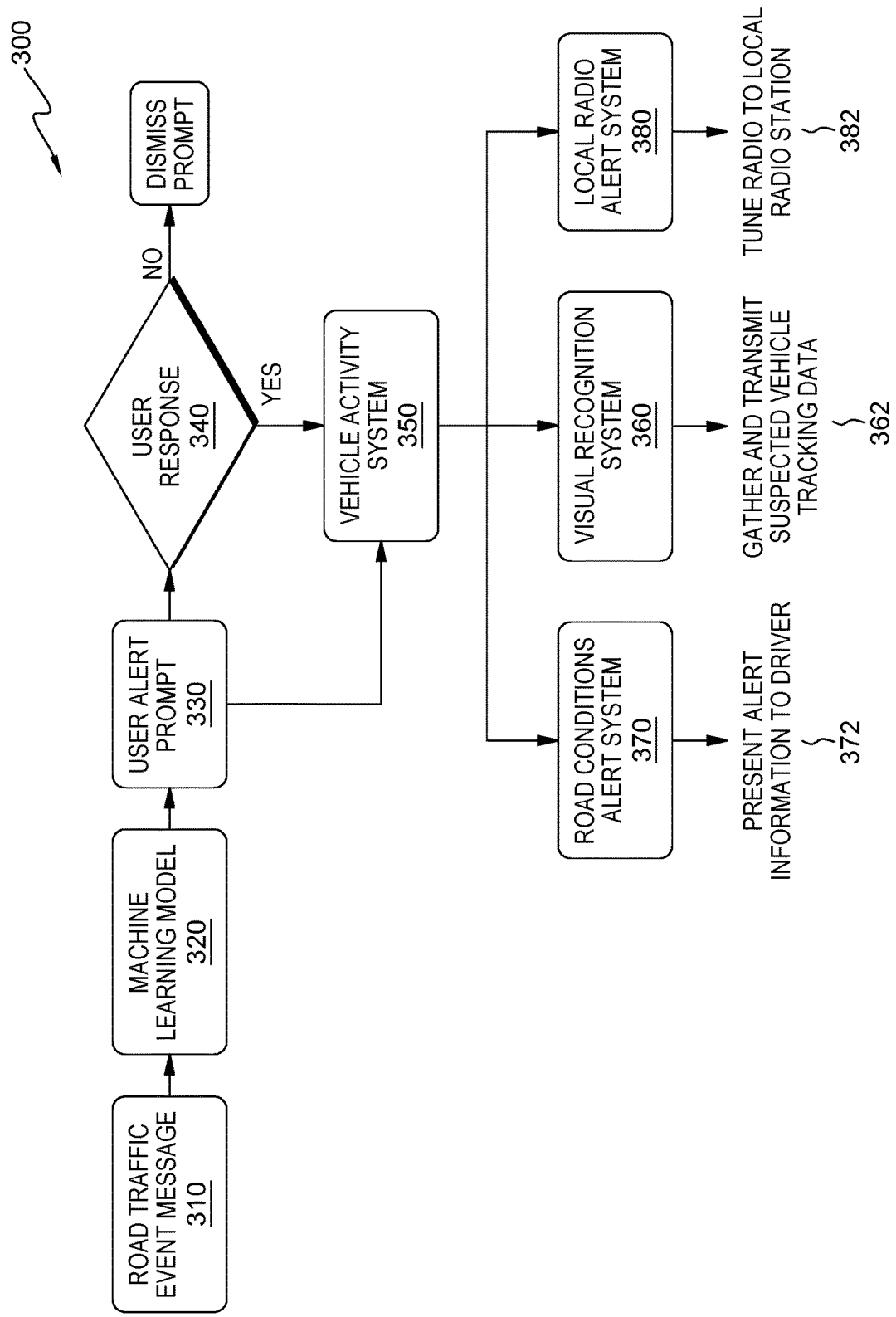
FIG. 3 illustrates a flowchart of a system depicting operational steps of a driver distraction reduction program, on a server computer within the distributed data processing environment of FIG. 1, for reducing vehicle occupant distractions, in accordance with an embodiment of the present invention.

FIG. 3 illustrates a flowchart of a system 300 depicting operational steps of a driver distraction reduction program, on a server computer within the distributed data processing environment of FIG. 1, for reducing vehicle occupant distractions, in accordance with an embodiment of the present invention.

In an embodiment, system 300 may include one or more processors configured to receive vehicle alert data corresponding to road traffic event message 310 and process the vehicle alert data by machine learning model 320 to generate user alert prompt 330. Further, system 300 may be configured to receive user response 340 from an occupant of a user vehicle in which user alert prompt 330 was presented. If user response 340 include a negative response, then the one or more processors may be configured to dismiss the prompt. If user response 340 is an affirmative response (e.g., "Yes"), then system 300 may be configured to activate vehicle activity system 350 to reduce user vehicle activity. For example, activating vehicle activity system 350 may include activating one or more of visual recognition system 360 (VRS), road conditions alert system 370, and local radio alert system 380.

In an embodiment, vehicle activity system 350 may include one or more processors configured for activating visual recognition system 360 if the determined intent corresponds to a vehicle event and user response 340 includes an affirmative response. For example, if user alert prompt 330 includes model output data from machine learning model 320 corresponding to a suspected vehicle and user response 340 is to track the suspected vehicle, then vehicle activity system 350 may be configured to activate visual recognition system 360 to gather and transmit suspected vehicle tracking data 362 to local authorities. For example, visual recognition system 360 may be configured to transmit instructions to one or more cameras positioned in or around the user vehicle to capture surrounding vehicle images to determine if the captured images resemble the suspected vehicle. Image recognition and machine learning techniques may be used to process the image data and generate model output data corresponding to a probability that one or more of the vehicles represented in the surrounding vehicle images fits the description of the suspected vehicle.

In an embodiment, visual recognition system 360 may be configured to generate a user alert to notify occupants of the vehicle on the status of tracking the suspected vehicle. For example, if visual recognition system 360 determines that one or more vehicles represented in the surrounding vehicle images fits the description of the suspected vehicle, then the one or more processors may be configured to present (e.g., audible message, visual message) information to the occupants of the user vehicle of the status (e.g., no vehicle match found, vehicle match found).

In an embodiment, vehicle activity system 350 may include one or more processors configured for activating road conditions alert system 370 if the determined intent corresponds to a road condition alert and user response 340 includes an affirmative response. For example, if user alert prompt 330 includes model output data from machine learning model 320 corresponding to a road condition event and user response 340 is affirmative to present the alert, then vehicle activity system 350 may be configured to activate road conditions alert system 370 to present alert information to driver 372. For example, road conditions alert system 370 may be configured to convert text data of the road condition alert in user alert prompt 330 to audio data and output the audio data to the user via a user interface. As another example, road conditions alert system 370 may be configured to display the road condition alert to the user via a user interface.

In an embodiment, vehicle activity system 350 may include one or more processors configured for activating local radio alert system 380 if the determined intent corresponds to a local radio alert (e.g., tune radio to local radio station) and user response 340 includes an affirmative response (e.g., tune radio to local station, yes). For example, if user alert prompt 330 includes model output data from machine learning model 320 corresponding to a local radio alert and user response 340 is affirmative to tune to the local radio station, then vehicle activity system 350 may be configured to local radio alert system 380 to tune radio to local radio station 382.

In an embodiment, vehicle activity system 350 may be configured to activate a system (e.g., visual recognition system 360, road conditions alert system 370, local radio alert system 380) appropriate for responding to road traffic event message 310, wherein the response is performed by the one or more processors to reduce vehicle occupant activity by occupants of the vehicle.

Figure 4:
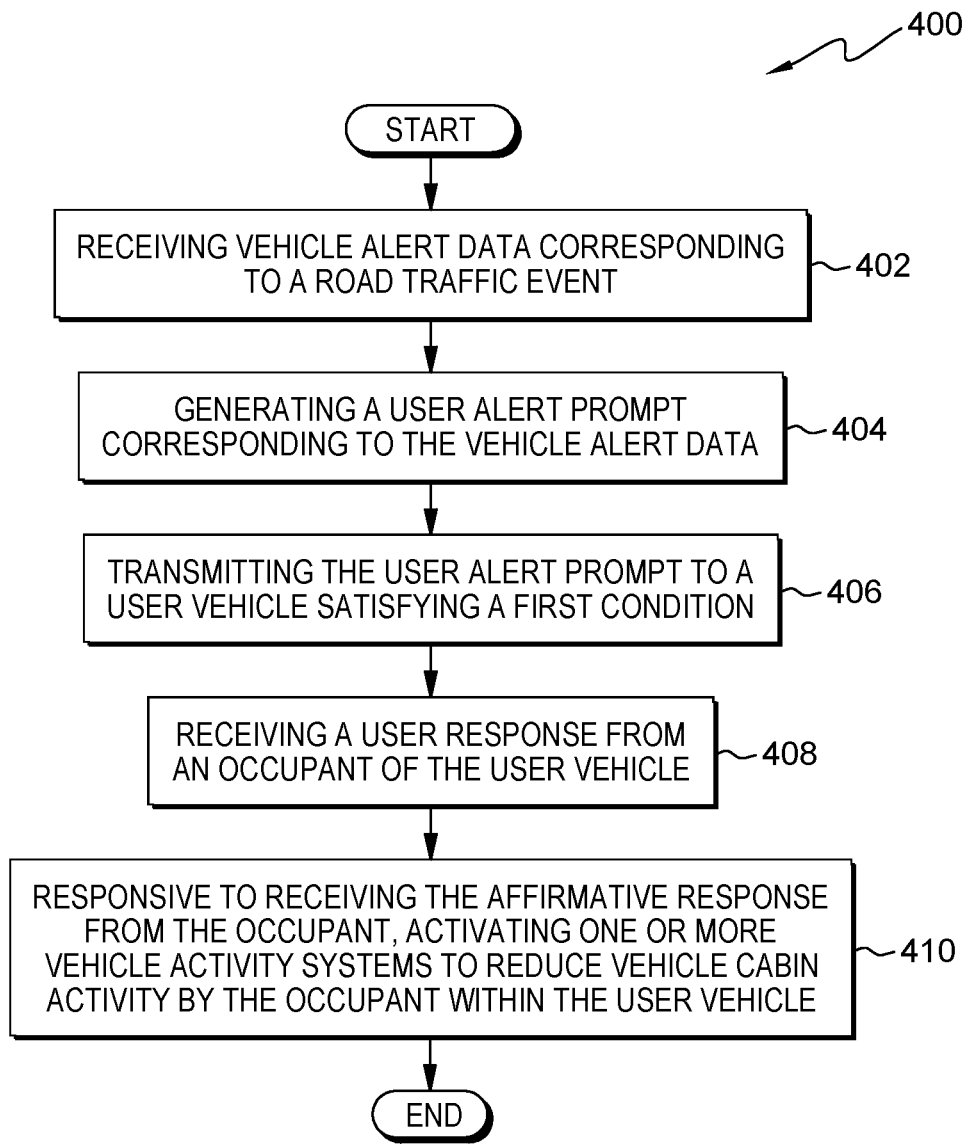
FIG. 4 illustrates operational steps of a computer-implemented method for reducing driver distraction, within the distributed data processing environment of FIG. 1, in accordance with an embodiment of the present invention.

FIG. 4 illustrates operational steps of computer-implemented method 400 for reducing driver distraction, within the distributed data processing environment of FIG. 1, in accordance with an embodiment of the present invention.

In an embodiment, computer-implemented method 400 may include one or more processors configured for receiving 402 vehicle alert data corresponding to a road traffic event. In an embodiment, the vehicle alert data may include vehicle information and incident information. Further, the road traffic event may include a suspected vehicle event and the affirmative user response may include a track vehicle user response corresponding to a user command to track a suspected vehicle described in the vehicle information. For example, if the user alert prompt includes a message corresponding to a missing vehicle or a suspected vehicle, and the user response includes a command (e.g., voice command, text input command, haptic command) to "track the vehicle" or "yes" in response to a prompt asking whether to track the vehicle or not, then the affirmative user response is the track vehicle user response.

In an embodiment, computer-implemented method 400 may include one or more processors configured for identifying an emergency message displayed within proximity of the user vehicle and determining the vehicle information and incident information based on the emergency message.

In an embodiment, computer-implemented method 400 may include one or more processors configured for generating 404 a user alert prompt corresponding to the vehicle alert data. For example, the user alert prompt may include a message communicating information represented in the vehicle alert data to occupants of the vehicle.

In an embodiment, computer-implemented method 400 may include one or more processors configured for transmitting 406 the user alert to a user vehicle satisfying a first condition. A condition is satisfied if one or more criteria (e.g., predetermined threshold) is met, exceeded, or not exceeded. For example, the user alert may be transmitted to the user vehicle if a location criterion (e.g., vehicle is within a specific geographic location), a time criterion (e.g., current time of vehicle is 1100 hours, time range between 0900 and 1500 hours), a user opt-in criterion (e.g., user opts-in to receive user alerts from the VRS), a user driver type criterion (e.g., user is a medical professional, user is a law enforcement professional, user is a truck driver, user is a livery driver) or a combination of criteria.

In an embodiment, computer-implemented method 400 may include one or more processors configured for receiving 408 a user response from an occupant of the user vehicle. In an embodiment, the user response may be received as an automatic opt-in for the occupant (e.g., driver, passenger) to activate or use the vehicle activity system. In an embodiment, the user response may be received as a contemporaneous acknowledgement to the user alert prompt. Further, in another embodiment, the user response may be silent or automatically implied by the user driving the user vehicle.

In an embodiment, responsive to receiving the affirmative response from the occupant, computer-implemented method 400 may include one or more processors configured for activating 410 one or more vehicle activity systems to reduce vehicle cabin activity by the occupant within the user vehicle. For example, responsive to receiving an affirmative user response from the occupant, one or more of the vehicle activity systems may be configured to reduce vehicle cabin activity by automatically gathering, processing, and transmitting data to local authorities or to other vehicles.

In an embodiment, responsive to receiving the track vehicle user response, computer-implemented method 400 may include one or more processors configured for activating a visual recognition system configured to capture proximate vehicle image data.

In an embodiment, computer-implemented method 400 may include one or more processors configured for determining that a suspected vehicle is identified in the proximate vehicle image data. In an embodiment, the suspected vehicle may be identified in the proximate vehicle image data if a second condition is satisfied. For example, if one or more vehicles represented in the proximate vehicle image data satisfies a condition (e.g., matches the suspected vehicle description by a predetermined threshold (e.g., probability greater than 90%)), then the one or more processors may identify the one or more vehicles as a match to the suspected vehicle.

In an embodiment, responsive to identifying the suspected vehicle in the proximate vehicle image data, computer-implemented method 400 may include one or more processors configured for transmitting tracking information to a local authority.

In an embodiment, identifying the emergency message may further include one or more processors configured for detecting emergency signs displayed within proximity of the user vehicle, receiving emergency sign image data corresponding to text displayed on the emergency signs, and processing, by a first machine learning model, the emergency sign image data to identify the emergency message.

In an embodiment, computer-implemented method 400 for determining that the suspected vehicle is identified in the proximate vehicle image data may further include one or more processors configured for receiving proximate vehicle image data at a second machine learning model, processing, by the second machine learning model, the proximate vehicle image data, and generating, by the second machine learning model, model output data corresponding to a probability that one or more vehicles represented in the proximate vehicle image data is (or resembles) the suspected vehicle.

In an embodiment, the second condition may be satisfied if the probability exceeds a predetermined threshold. For example, the machine learning model may be an artificial neural network (ANN) trained with image data corresponding to vehicles and vehicle descriptions to achieve a high probability of correct recognition. For instance, the ANN may be trained with thousands, millions, or even more vehicle images assigned to basic categories corresponding to features of the vehicles. The ANN may perform image analysis (e.g., segmentation, feature analysis, classification) performed over multiple layers and through multiple connections.

In an embodiment, model output data may correspond to the output data generated from the multiple layers and connections in the ANN and may correspond to a classification of whether the image data processed by the trained ANN meets a certain criterion. For example, the VRS may receive input data corresponding to a suspected vehicle matching the following description: Make (e.g., Nissan), Model (e.g., Altima), Color (e.g., Silver), Year (e.g., 2015) License Plate Information (e.g., GA 123ABC). Next, the VRS may be configured to process the suspected vehicle input data to begin scanning surrounding areas to gather proximate vehicle image data corresponding to vehicles within proximity of the user vehicle. Further, the vehicle image data may be processed by the second machine learning model (e.g., trained ANN) to determine a probability that one or more vehicles represented in the proximate vehicle image data matches the suspected vehicle image data. For example, a match may be determined if the model output data corresponds to a probability that is greater than a predetermined threshold (e.g., 90%) for one or more vehicles.

In an embodiment, the predetermined threshold may be adjusted based on the level of specificity in the suspected vehicle description. For example, if the suspect vehicle description includes a subset (e.g., 3 out of 5) of the total number of features, then the predetermined threshold may be increased to return a lower number of matching vehicle results. As another example, if the suspect vehicle description includes one or more features with a certainty greater than a predetermined amount, then the predetermined threshold may be decreased to return a high number of matching vehicle results. For instance, if the License Plate Information includes a certainty predetermined amount greater than 80% (e.g., 100%), then the predetermined threshold may be decreased to return a lower number of matching vehicle results.

In an embodiment, one benefit of making these adjustments is to allow for a change in one or more of the suspect vehicle descriptions. For example, if a suspect driving a first suspected vehicle matching a first description changes to driving a second suspect vehicle matching a second description, but retains the same License Plate, then the VRS may identify the second suspect vehicle even if only the License Plate Information returns a match. Similarly, other suspect vehicle descriptors may be assigned a level of certainty to account for cosmetic changes to the suspect vehicle.

Figure 5:
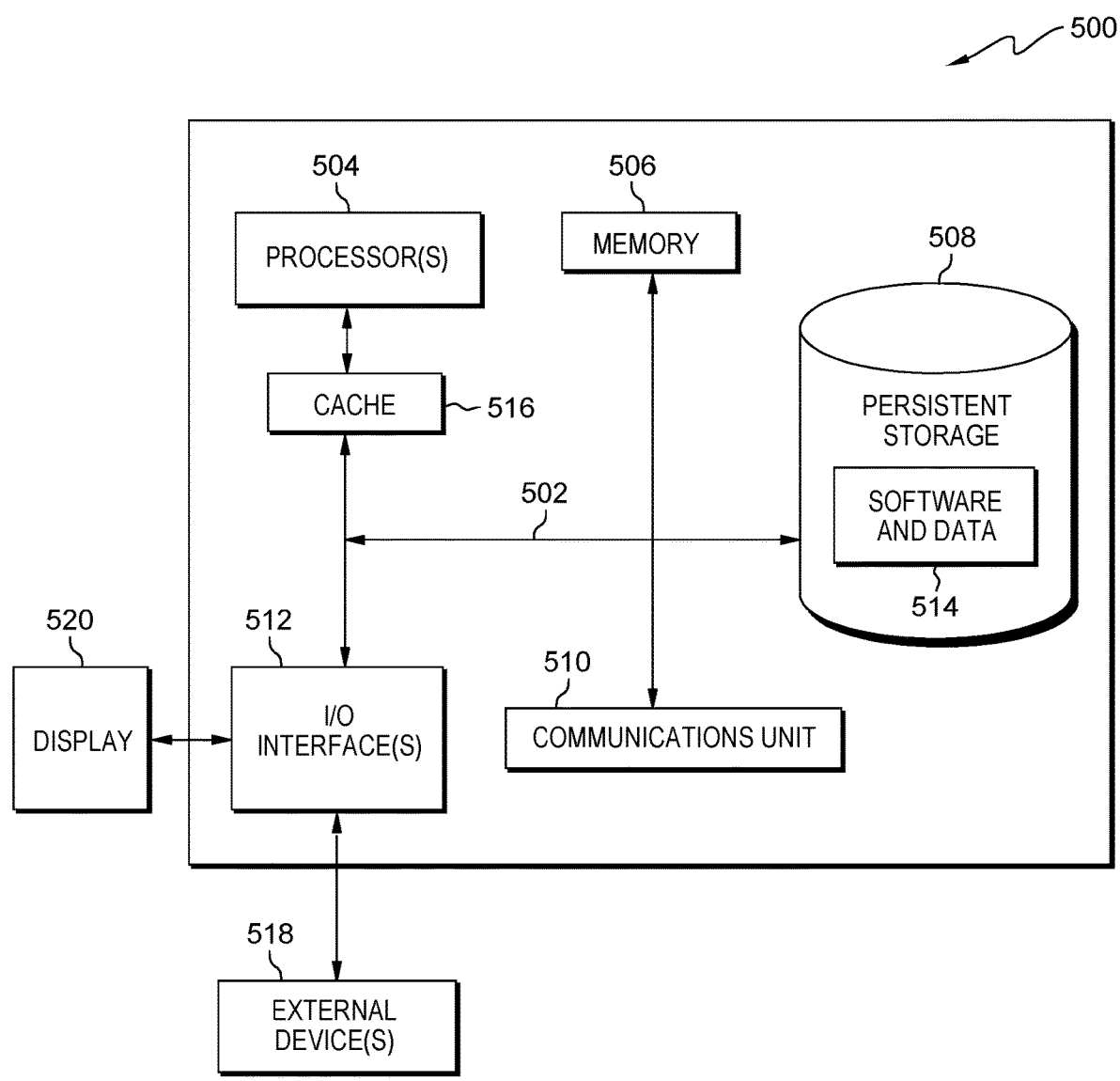
FIG. 5 depicts a block diagram of components of the server computer executing the driver distraction reduction program within the distributed data processing environment of FIG. 1, in accordance with an embodiment of the present invention.

FIG. 5 depicts a block diagram of components of user device 120 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, vehicle alert data corresponding to a road traffic event;
   generating, by one or more processors, a user alert prompt corresponding to the vehicle alert data;
   transmitting, by one or more processors, the user alert prompt to a user vehicle satisfying a first condition;
   receiving, by one or more processors, a user response from an occupant of the user vehicle; and
   responsive to receiving an affirmative user response from the occupant, activating, by one or more processors, one or more vehicle activity systems;
   wherein the vehicle alert data includes vehicle information and incident information, the road traffic event is a suspected vehicle event, and the affirmative user response is a track vehicle user response corresponding to a user command to track a suspected vehicle described in the vehicle information;
   the computer-implemented method further comprising:
   determining that the suspected vehicle is identified in proximate vehicle image data by:
      receiving, by one or more processors, proximate vehicle image data at a second machine learning model,
      processing, by the second machine learning model, the proximate vehicle image data, and
      generating, by the second machine learning model, model output data corresponding to a probability that one or more vehicles represented in the proximate vehicle image data is the suspected vehicle.

2. The computer-implemented method of claim 1, further comprising:
responsive to receiving the track vehicle user response, activating, by one or more processors, a visual recognition system comprising one or more cameras focused on areas proximate to the user vehicle;
determining, by one or more processors, that the suspected vehicle is identified in proximate vehicle image data captured by the one or more cameras; and
responsive to identifying the suspected vehicle in the proximate vehicle image data, transmitting, by one or more processors, tracking information to a local authority.

3. The computer-implemented method of claim 1, wherein receiving the vehicle alert data further comprises:
identifying, by one or more processors, an emergency message displayed within proximity of the user vehicle; and
determining, by one or more processors, the vehicle information and incident information based on the emergency message.

4. The computer-implemented method of claim 3, wherein identifying the emergency message further comprises:
detecting, by one or more processors, emergency signs displayed within proximity of the user vehicle;
receiving, by one or more processors, emergency sign image data corresponding to text displayed on the emergency signs; and
processing, by a first machine learning model, the emergency sign image data to identify the emergency message.

5. The computer-implemented method of claim 1, wherein the suspected vehicle is identified if a second condition is satisfied, wherein the second condition corresponds to the probability exceeding a predetermined threshold.

6. A computer program product, comprising:
one or more non-transitory computer readable storage media and program instructions collectively stored on one or more computer readable storage media, the stored program instructions comprising:
program instructions to receive vehicle alert data corresponding to a road traffic event;
program instructions to generate a user alert prompt corresponding to the vehicle alert data;
program instructions to transmit the user alert prompt to a user vehicle satisfying a first condition;
program instructions to receive a user response from an occupant of the user vehicle; and
responsive to receiving an affirmative user response from the occupant, program instructions to activate one or more vehicle activity systems;
wherein the vehicle alert data comprises vehicle information and incident information, the road traffic event is a suspected vehicle event, and the affirmative user response is a track vehicle user response corresponding to a user command to track a suspected vehicle described in the vehicle information; and
the stored program instructions further comprising:
program instructions to determine that the suspected vehicle is identified in proximate vehicle image data by:
receiving proximate vehicle image data at a second machine learning model,
processing, by the second machine learning model, the proximate vehicle image data, and
generating, by the second machine learning model, model output data corresponding to a probability that one or more vehicles represented in the proximate vehicle image data is the suspected vehicle.

7. The computer program product of claim 6, further comprising:
responsive to receiving the track vehicle user response, program instructions to activate a visual recognition system comprising one or more cameras focused on areas proximate to the user vehicle;
program instructions to determine that the suspected vehicle is identified in proximate vehicle image data; and
responsive to identifying the suspected vehicle in proximate vehicle image data, program instructions to transmit tracking information to a local authority.

8. The computer program product of claim 6, wherein the program instructions to receive the vehicle alert data further comprises:
program instructions to identify an emergency message displayed within proximity of the user vehicle; and
program instructions to determine the vehicle information and incident information based on the emergency message.

9. The computer program product of claim 8, wherein the program instructions to identify the emergency message further comprises:
program instructions to detect emergency signs displayed within proximity of the user vehicle;
program instructions to receive emergency sign image data corresponding to text displayed on the emergency signs; and
program instructions to process, by a first machine learning model, the emergency sign image data to identify the emergency message.

10. The computer program product of claim 6, wherein the suspected vehicle is identified if a second condition is satisfied, wherein the second condition corresponds to the probability exceeding a predetermined threshold.

11. A computer system, comprising:
one or more computer processors;
one or more computer readable storage media;
program instructions collectively stored on one or more computer readable storage media for execution by at least one of one or more computer processors, the stored program instructions comprising:
program instructions to receive vehicle alert data corresponding to a road traffic event;
program instructions to generate a user alert prompt corresponding to the vehicle alert data;
program instructions to transmit the user alert prompt to a user vehicle satisfying a first condition;
program instructions to receive a user response from an occupant of the user vehicle; and
responsive to receiving an affirmative user response from the occupant, program instructions to activate one or more vehicle activity systems;
wherein the vehicle alert data comprises vehicle information and incident information, the road traffic event is a suspected vehicle event, and the affirmative user response is a track vehicle user response corresponding to a user command to track a suspected vehicle described in the vehicle information; and the stored program instructions further comprising:
program instructions to determine that the suspected vehicle is identified in proximate vehicle image data by:
receiving proximate vehicle image data at a second machine learning model,
processing, by the second machine learning model, the proximate vehicle image data, and
generating, by the second machine learning model, model output data corresponding to a probability that one or more vehicles represented in the proximate vehicle image data is the suspected vehicle.

12. The computer system of claim 11, further comprising:
responsive to receiving the track vehicle user response, program instructions to activate a visual recognition system comprising one or more cameras focused on areas proximate to the user vehicle;
program instructions to determine that the suspected vehicle is identified in proximate vehicle image data captured by the one or more cameras; and
responsive to identifying the suspected vehicle in the proximate vehicle image data, program instructions to transmit tracking information to a local authority.

13. The computer system of claim 11, wherein the program instructions to receive the vehicle alert data further comprises:
program instructions to identify an emergency message displayed within proximity of the user vehicle; and
program instructions to determine the vehicle information and incident information based on the emergency message.

14. The computer system of claim 13, wherein the program instructions to identify the emergency message further comprises:
program instructions to detect emergency signs displayed within proximity of the user vehicle;
program instructions to receive emergency sign image data corresponding to text displayed on the emergency signs; and
program instructions to process, by a first machine learning model, the emergency sign image data to identify the emergency message.

* * * * *